United States Patent
Lennen

(10) Patent No.: US 11,294,067 B2
(45) Date of Patent: Apr. 5, 2022

(54) SYSTEM AND METHOD FOR PROVIDING GLOBAL NAVIGATION SATELLITE SYSTEM (GNSS) SIGNAL PROCESSING IN MULTIPATH ENVIRONMENT

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd

(*) Notice: Subject to any disclaimer, the term of this patent is extended or adjusted under 35 U.S.C. 154(b) by 88 days.

(21) Appl. No.: 16/848,225

(22) Filed: Apr. 14, 2020

(65) Prior Publication Data
US 2021/0173091 A1 Jun. 10, 2021

Related U.S. Application Data

(60) Provisional application No. 62/944,652, filed on Dec. 6, 2019.

(51) Int. Cl.
*G01S 19/22* (2010.01)
*G01S 19/31* (2010.01)
*G01S 19/30* (2010.01)

(52) U.S. Cl.
CPC .............. *G01S 19/22* (2013.01); *G01S 19/30* (2013.01); *G01S 19/31* (2013.01)

(58) Field of Classification Search
CPC ........... G01S 19/22; G01S 19/30; G01S 19/32
See application file for complete search history.

(56) References Cited

U.S. PATENT DOCUMENTS 7,486,717 B2 2/2009 De Wilde et al.
7,916,771 B2 3/2011 Julien et al.
(Continued)

FOREIGN PATENT DOCUMENTS

| CA | 2507360 | 11/2005 |
|---|---|---|
| CN | 103439718 | 12/2013 |

(Continued)

OTHER PUBLICATIONS

D. Margaria et al., A new strategy to mitigate side-peak lock errors in tracking multi-peak code correlation functions, 2014 7th ESA Workshop on Satellite Navigation Technologies and European Workshop on GNSS Signals and Signal Processing (NAVITEC), p. 1-8. 2014 (Year: 2014).*

*Primary Examiner* — Bernarr E Gregory
*Assistant Examiner* — Fred H Mull
(74) *Attorney, Agent, or Firm* — The Farrell Law Firm, P.C.

(57) ABSTRACT

A method and system are herein provided. The method may include receiving a GNSS signal, determining a normalized correlation window of the GNSS signal, determining an early sidelobe lock ($E_{lock}$), a late sidelobe lock value ($L_{lock}$), and main sidelobe lock ($M_{lock}$) value based on the normalized correlation window, determining an early sidelobe lock ($E_{lock}$), a late sidelobe lock value ($L_{lock}$), and main sidelobe lock ($M_{lock}$) value based on the normalized correlation window, and determining an early sidelobe lock ($E_{lock}$), a late sidelobe lock value ($L_{lock}$), and main sidelobe lock ($M_{lock}$) value based on the normalized correlation window.

20 Claims, 7 Drawing Sheets

(56) References Cited

U.S. PATENT DOCUMENTS

| | | |
|---|---|---|
| 8,149,897 B2 | 4/2012 | Abraham |
| 8,305,268 B2 | 11/2012 | Lennen |
| 8,964,813 B2 | 2/2015 | Hodgart et al. |
| 2001/0002203 A1* | 5/2001 | Cahn ................ G01S 19/22 375/142 |
| 2007/0176676 A1 | 8/2007 | Pratt et al. |
| 2009/0207891 A1 | 8/2009 | Pon |
| 2010/0104046 A1* | 4/2010 | Hodgart ............ G01S 19/30 375/340 |
| 2011/0103432 A1* | 5/2011 | Tangudu ........... G01S 19/21 375/150 |
| 2013/0201365 A1* | 8/2013 | Wirola ............. G01S 5/0263 348/231.3 |
| 2014/0125522 A1 | 5/2014 | Lee et al. |
| 2016/0170027 A1* | 6/2016 | Margaria .......... G01S 19/22 342/357.61 |
| 2019/0196023 A1 | 6/2019 | Lennen |

FOREIGN PATENT DOCUMENTS

| | | |
|---|---|---|
| CN | 104199067 | 12/2014 |
| CN | 106054215 | 10/2016 |
| EP | 2796896 | 10/2014 |

* cited by examiner

SYSTEM AND METHOD FOR PROVIDING GLOBAL NAVIGATION SATELLITE SYSTEM (GNSS) SIGNAL PROCESSING IN MULTIPATH ENVIRONMENT

PRIORITY

This application is based on and claims priority under 35 U.S.C. § 119(e) to U.S. Provisional Patent Application filed on Dec. 6, 2019 in the United States Patent and Trademark Office and assigned Ser. No. 62/944,652, the entire contents of which are incorporated herein by reference.

FIELD

The present disclosure is generally related to a global navigation satellite system (GNSS) signal processing system. In particular, the present disclosure is related to a system and method for providing GNSS signal processing in a multipath environment.

BACKGROUND

A GNSS receiver (e.g., global positioning system (GPS), Galileo, Beidou, and GLONASS) determines its location based on signals received from GNSS satellites. In particular, Galileo, which is a GNSS provided by Europe, will be interoperable with GPS provided by the United States and GLONASS provided by Russia. A GNSS receiver will be able to determine a position from any satellites in combination. Galileo provides BOC modulation on its GNSS signals.

BOC refers to a signal resulting from a modulation that multiplies a pseudo-random noise (PRN) spreading code with a square wave sub-carrier (SC) that has a frequency multiple of the code rate. It creates a symmetric split spectrum with two main lobes shifted from the center frequency by the frequency of the sub-carrier.

A BOC modulated signal may be displayed by $BOC(f_c, f_s)$, where fc represents the code chip rate, and fs is the frequency of the sub-carrier. Both $f_c$ and $f_s$ are typically noted as a multiple of the reference frequency 1.023 MHz. A BOC signal includes a sub-carrier that introduces secondary peaks in BOC autocorrelation. Such secondary peaks may cause an issue if the GNSS receiver locks onto a side peak instead of a main peak.

SUMMARY

According to one embodiment, a method includes receiving a GNSS signal, determining a normalized correlation window of the GNSS signal, determining an early sidelobe lock ($E_{lock}$), a late sidelobe lock value ($L_{lock}$), and main sidelobe lock ($M_{lock}$) value based on the normalized correlation window, determining an early sidelobe lock ($E_{lock}$), a late sidelobe lock value ($L_{lock}$), and main sidelobe lock ($M_{lock}$) value based on the normalized correlation window, and determining an early sidelobe lock ($E_{lock}$), a late sidelobe lock value ($L_{lock}$), and main sidelobe lock ($M_{lock}$) value based on the normalized correlation window.

According to one embodiment, a system includes a GNSS receiver, a memory, and a processor configured to determine a normalized correlation window of a received GNSS signal, determine an early sidelobe lock ($E_{lock}$), a late sidelobe lock value ($L_{lock}$), and main sidelobe lock ($M_{lock}$) value based on the normalized correlation window, determine a state of the receiver based on the determined $E_{lock}$, $L_{lock}$, and $M_{lock}$ values, and when the state of the receiver is such that an early lobe of the GNSS signal, a late lobe of the GNSS signal, and a mainlobe of the GNSS signal are false, perform multipath mitigation.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
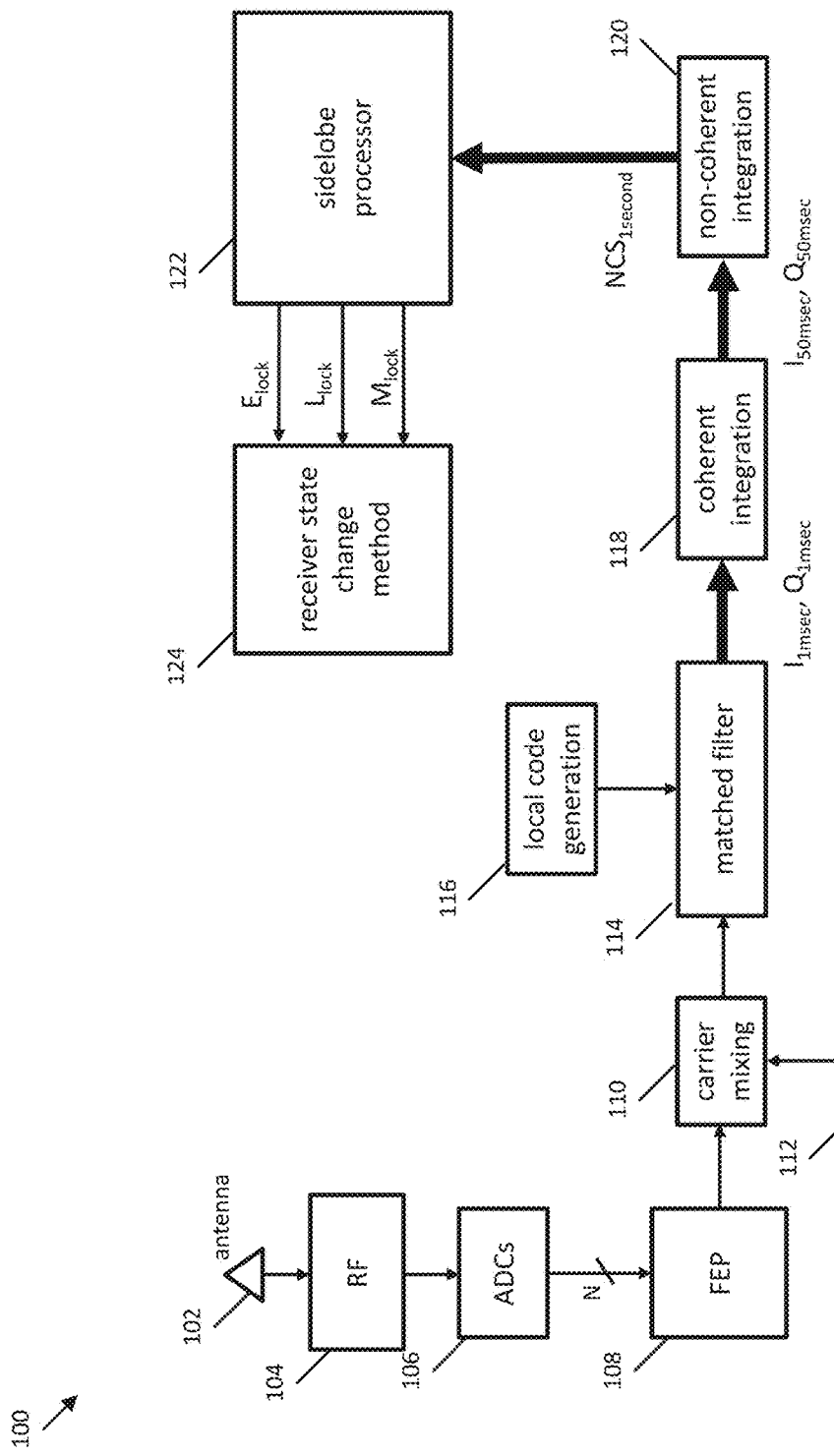
FIG. 1 illustrates a diagram of a GNSS receiver, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provides GNSS signal processing in a multipath environment. It is appreciated that the present system and method is applicable to Galileo binary offset carrier (BOC)(1,1) processing and other types of GNSS systems with BOC(1,1) signal structure (e.g., GPS L1-C, Beidou B1-C) without deviating from the scope of the present disclosure. FIG. 1 illustrates a diagram of a GNSS receiver, according to an embodiment. The system 100 includes an antenna 102, a radio frequency (RF) block 104, analog-to-digital converters 106, a front end processor (FEP) 108, a carrier mixing block 110 that receives the signal from the FEP 108 and a local carrier generation block 112, a matched filter 114 that receives the output of the carrier mixing block 110 and the output of a local code generation block 116, a coherent integration block 118, a non-coherent integration block 120 and a sidelobe processor 122 that receives the output of the non-coherent integration block 120. Alternatively, the output of the coherent integration block 118 may be processed by the processor 122 directly, bypassing the non-coherent integration block 120. This, the coherent values $I_{50\ msec}$ and $Q_{50\ msec}$ values can each be used to compute $L_{lock}$, etc, As described below, the sidelobe processor 122 generates an early sidelobe lock value $E_{lock}$, late sidelobe lock value $L_{lock}$, and main sidelobe lock value $M_{lock}$. These values are input to the receiver state change algorithm 124 to determine whether to change a state of the GNSS receiver.

The present system and method provides identification of sidelobe tracking in the presence of multipath. The present system and method further determines that a sidelobe has been detected correctly based on a probability of false detection of a sidelobe being less than a threshold (e.g., $<10^{-6}$) before processing the sidelobe. Otherwise, the present system performs multipath mitigation on the sidelobe and re-tests for ambiguity resolution.

In one embodiment, the present system and method for determining a GNSS receiver state algorithm using sidelobe detection in the presence of multipath includes receiving a set of fixed-period correlation windows, providing a normalized correlation window from the set of correlation windows, determining an adjusted early sidelobe lock $E_{lock}$, late sidelobe lock $L_{lock}$, and main sidelobe lock $M_{lock}$ based on the normalized correlation window and reference versions of the early sidelobe lock, the late sidelobe lock, and the main sidelobe lock respectively, and adjusting a receiver state based on lock values of $E_{lock}$, $L_{lock}$, and $M_{lock}$.

The BOC(1,1) signal structure type is important for current and future GNSS. GPS, Galileo, Beidou and GLONASS all are or are planning to transmit BOC(1,1) type signals.

The Galileo BOC(1,1) correlation function has three peaks and it is possible for the code tracking loop to lock onto one of the side peaks. The ability to decide on sidelobe or mainlobe tracking is limited by multipath scenarios, therefore the system can decide the following limited set of states: (1) a positive decision that mainlobe is correctly code tracked, do nothing (very low $P_{fa}$ (probability of falsely identifying the sidelobe or mainlobe)); (2) a positive decision that early sidelobe is code tracked, shift code tracking point late by $\approx$X meters (can be done without loss of lock), very low $P_{fa}$; (3) a positive decision that late sidelobe is code tracked, shift code tracking point late by $\approx$-X meters, very low $P_{fa}$; and (4) when no positive mainlobe or sidelobe decisions are available, do nothing or chose to run multipath mitigation algorithms.

The systems and methods disclosed herein may operate on the E1-C signal, but are applicable to any BOC(1,1) signal (or other BOC). I and Q are read every 50 msecs, where the nth 50 msec coherent values are given by $I(n)_{50}$ and $Q(n)_{50}$. The signal power is computed as in Equation (1).

$$P(n)_{50} = I(n)_{50}^2 + Q(n)_{50}^2 \quad (1)$$

The signal is then non-coherently accumulated as in Equation (2).

$$P_{1\ second} = \Sigma_{1\ \ldots\ N} P_{50}(n) \quad (2)$$

The sum of difference squared (SoDS) metric is determined as in Equations (3), (4), and (5).

$$E_{lock} = \Sigma_{I=1\ldots N}[C_{normal}(i) - E_{ref}(i)]^2 \quad (3)$$

$$L_{lock} = \Sigma_{I=1\ldots N}[C_{normal}(i) - L_{ref}(i)]^2 \quad (4)$$

$$M_{lock} = \Sigma_{I=1\ldots N}[C_{normal}(i) - M_{ref}(i)]^2 \quad (5)$$

$E_{ref}$, $L_{ref}$ and $M_{ref}$ represent reference values for the early sidelobe, late sidelobe and main sidelobe, respectively. Each of the lock values is compared with a predetermined threshold (e.g. $E_{lock}$ is compared with $E_T$). The threshold values may be determined via simulation, mathematically or field data. A lower value of each lock metric indicates a higher probability of a match. The $E_{lock}$ values may also be compared with each other to determine the track state. In this case, a new threshold is used, such as $E_{lock}/M_{lock} > EM_T$=early sidelobe lock.

Reference signals may be generated via simulation or derived empirically via test equipment, or mathematically via theory. Reference signals are no (or at least low) noise versions of the correlation functions with the following characteristics: (1) there are reference versions for early sidelobe lock, $E_{ref}$, for late sidelobe lock, $L_{ref}$, and for mainlobe lock, $M_{ref}$; and (2) the reference correlations are used in the root mean square (RMS) difference computation that generates values $E_{lock}$, $L_{lock}$ and $M_{lock}$.

A "magnitude" version is also possible, by taking the square root of P(n) in Equation (1). The magnitude version of (3), (4) and (5) are derived by taking the square root of the right side of each equation. Both power and magnitude versions are equally valid.

Figure 2:
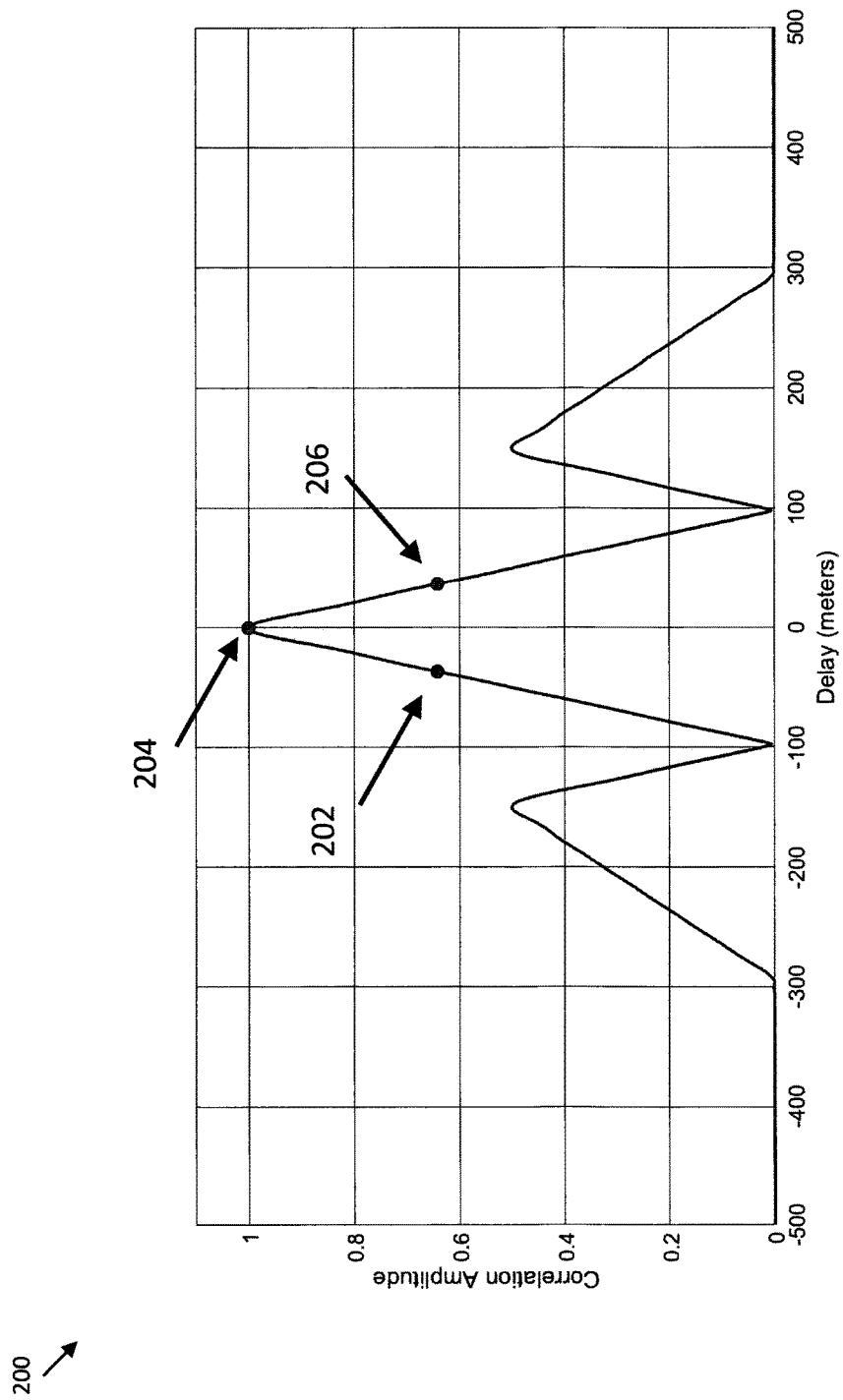
FIG. 2 illustrates a diagram of a reference wave form for the main sidelobe, according to an embodiment.
Figure 3:
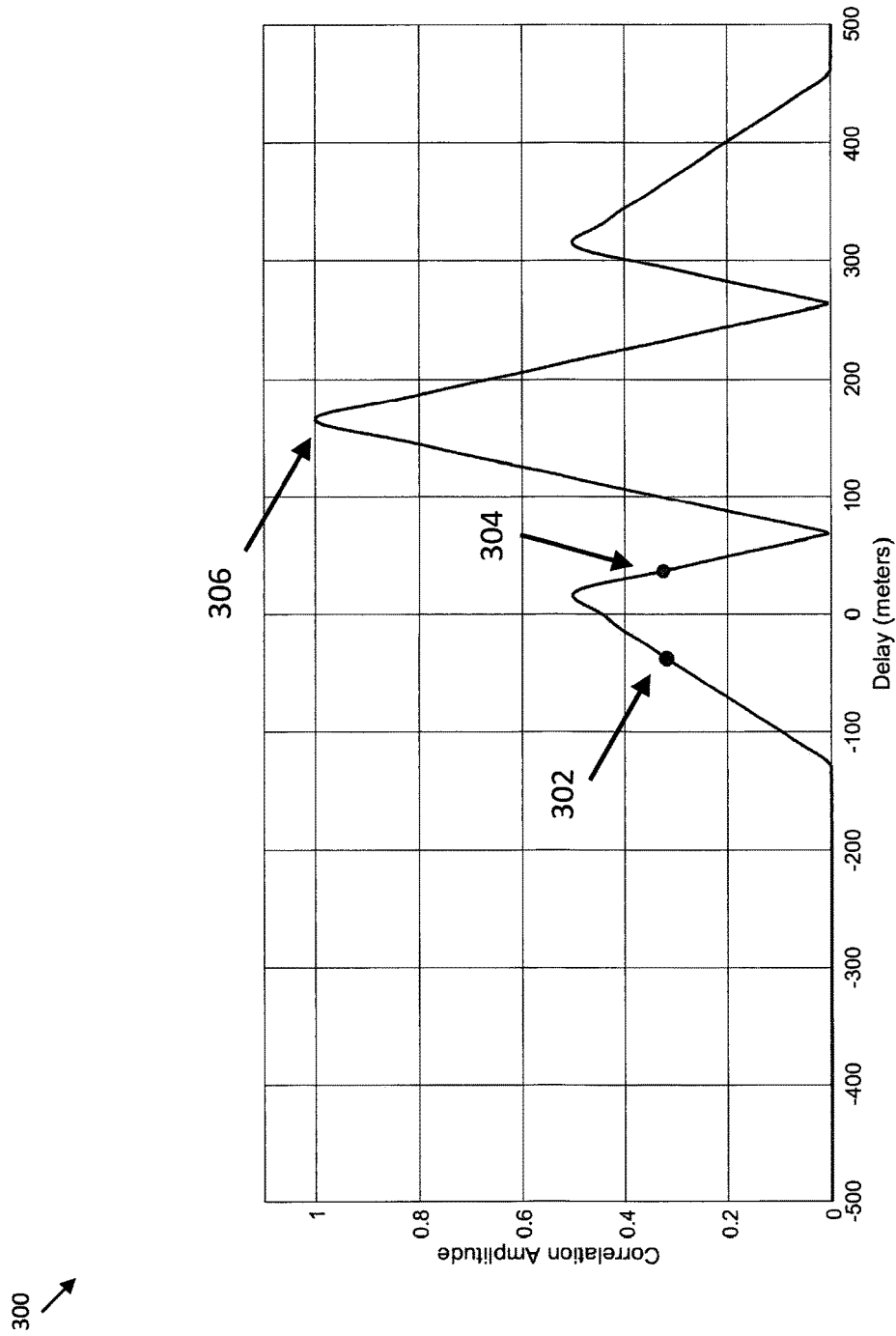
FIG. 3 illustrates a diagram of a reference wave form for the early sidelobe, according to an embodiment.
Figure 4:
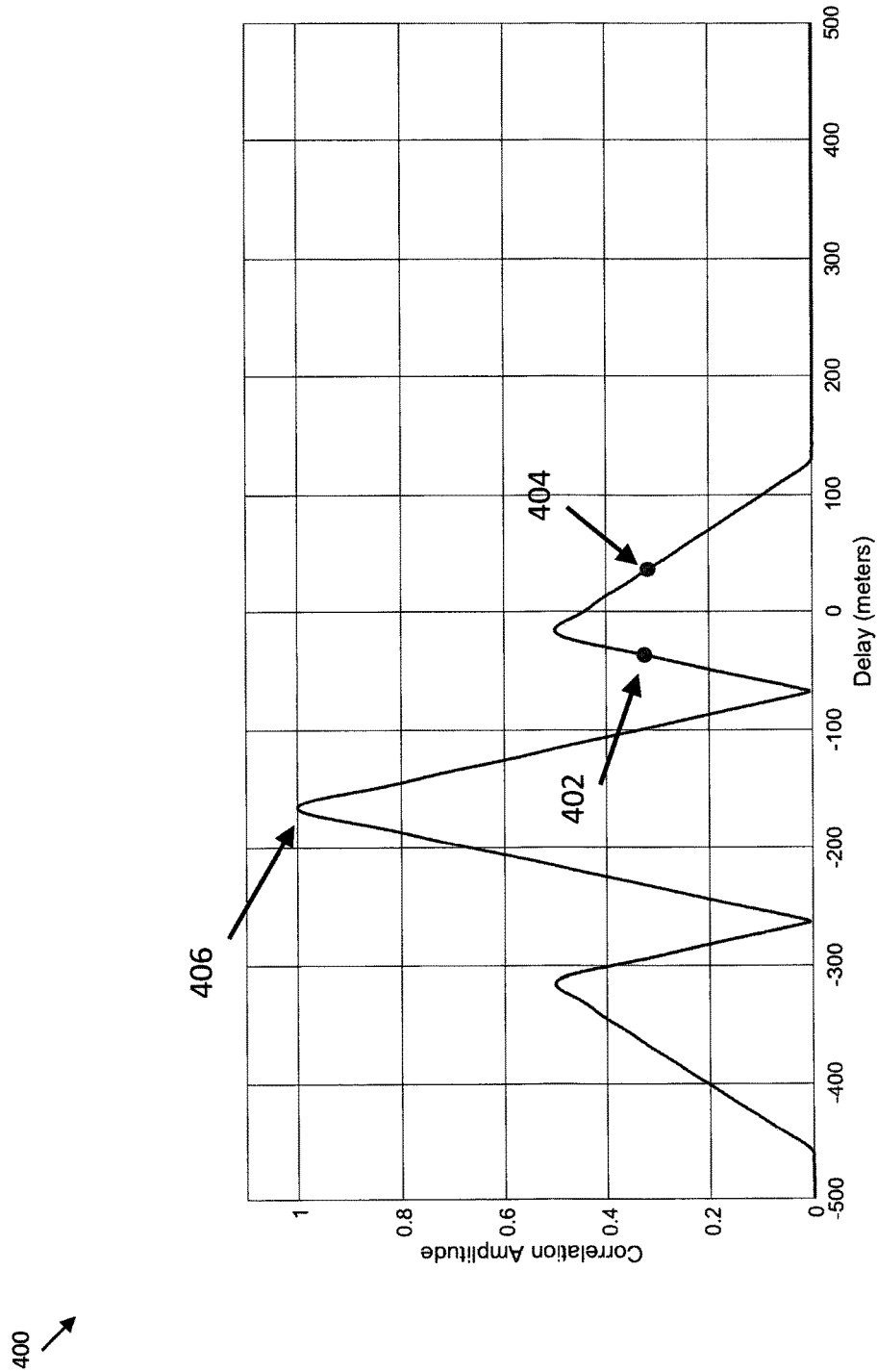
FIG. 4 illustrates a diagram of a reference wave form for the late sidelobe, according to an embodiment.

FIG. 2 illustrates a diagram of a reference wave form for the main sidelobe, according to an embodiment. As shown in FIG. 2, the reference wave form 200 includes an early point 202, a punctual point, 204 and a late point 206. FIG. 3 illustrates a diagram of a reference wave form for the early sidelobe, according to an embodiment. The reference wave form 300 includes an early point 302 and a late point 304. The main peak 306 is offset by about +165 meters. FIG. 4 illustrates a diagram of a reference wave form for the late sidelobe, according to an embodiment. The reference wave form 400 includes an early point 402 and a late point 404. The main peak 406 is offset by about -165 meters.

Figure 5:
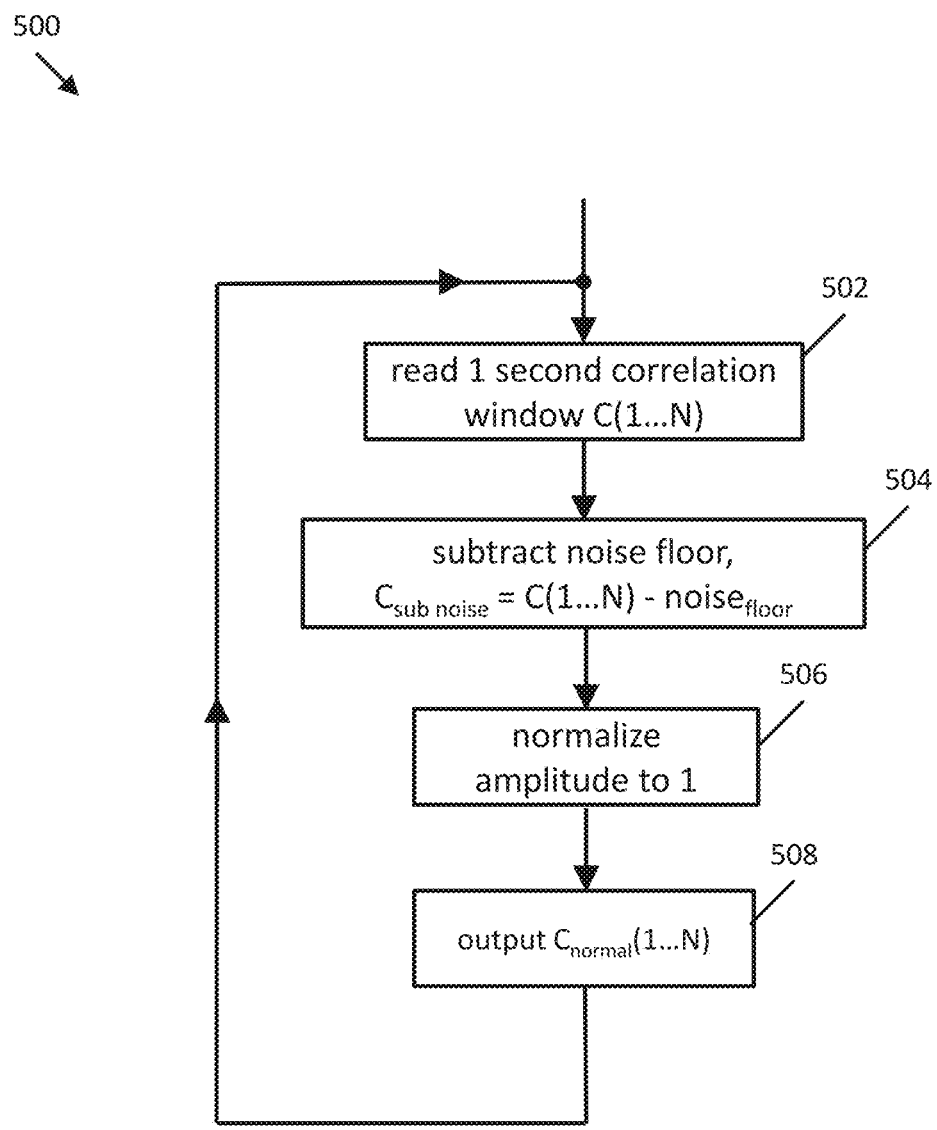
FIG. 5 illustrates a flowchart for normalization, according to an embodiment.

FIG. 5 illustrates a flowchart 500 for normalization, according to an embodiment. At 502, the system reads a 1 second correlation window of a received signal. At 504, the system subtracts the noise floor. At 506, the system normalizes the amplitude to 1. At 508, the system outputs the normalized correlation window. The normalization process is used in the generation of reference correlation windows and when processing the received correlation window in preparation for the SoSD computation.

Figure 6:
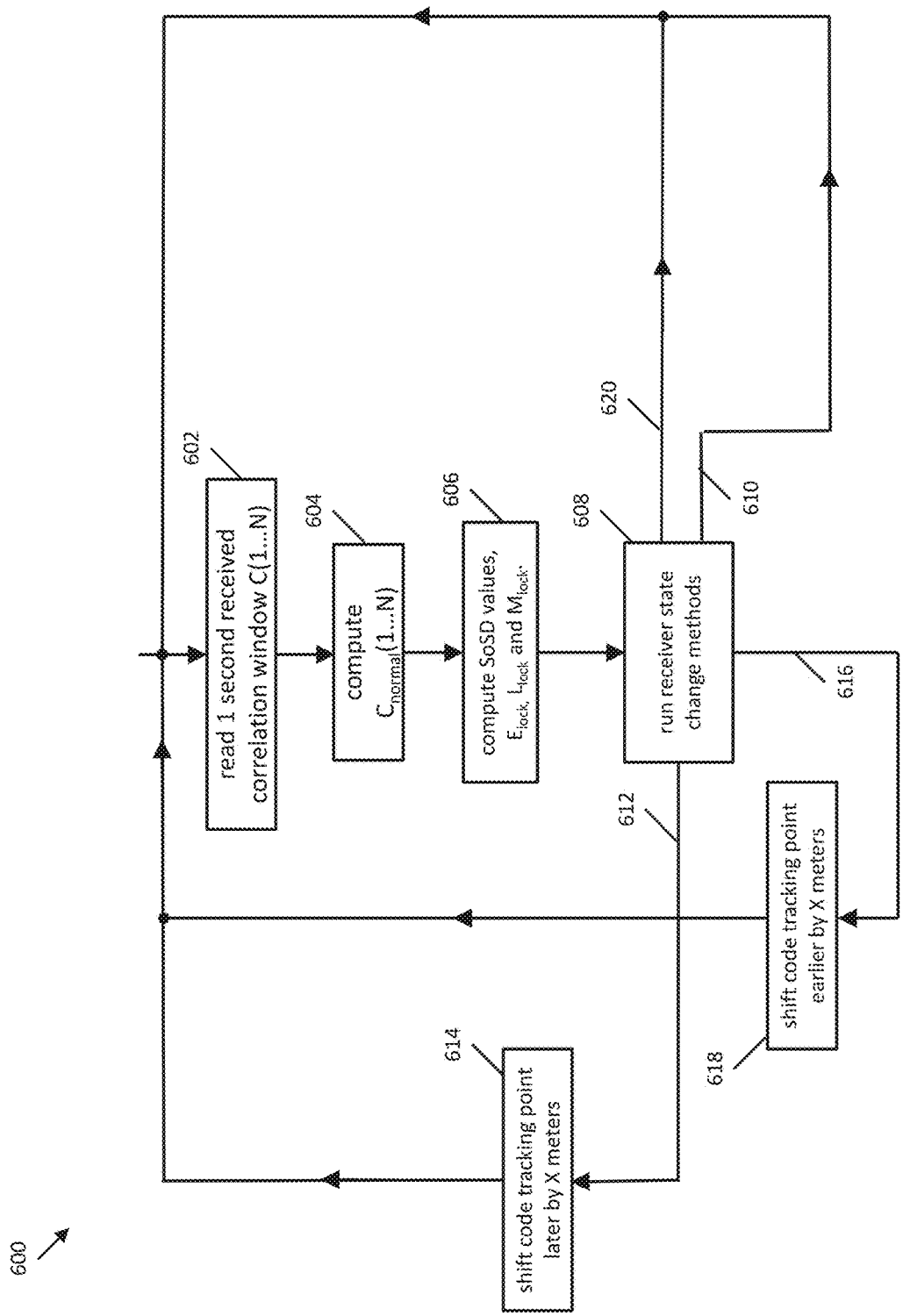
FIG. 6 illustrates a flowchart for a receiver state change method, according to an embodiment.

FIG. 6 illustrates a flowchart 600 for a receiver state change method, according to an embodiment. At 602, the system reads a one second correlation window of a GNSS signal. At 604, the system determines the normalized correlation window. At 606, the system determines the early sidelobe lock $E_{lock}$, late sidelobe lock $L_{lock}$, and main sidelobe lock $M_{lock}$ values. At 608, the system determines a receiver state based on the determined $E_{lock}$, $L_{lock}$, and $M_{lock}$ values. When the receiver is in a first state 610 in which the mainlobe is true while the early and late lobes are false, the system repeats steps 602-608. When the receiver is in a second state 612 in which the early lobe is true while the late lobe and the mainlobe is false, the system may shift a tracking point in the signal later by a predetermined number of meters at 614. When the receiver is in a third state 616 in which the late lobe is true while the early lobe and mainlobe are false, the system shifts a tracking point in the signal earlier by a predetermined number of meters at 618.

When the receiver is in a fourth state 620 in which the early lobe, late lobe and mainlobe are false, the system may perform a multipath mitigation process. The system may re-test the signal for ambiguity resolution, including a subtraction algorithm or a pattern recognition algorithm. The system may determine whether a receiver time uncertainty is small enough to select a nearest peak. For example, the system may have a predetermined uncertainty value threshold, and if the uncertainty value is less than the predetermined uncertainty value threshold, the system select the nearest peak. The system may determine whether another signal is being tracked unambiguously. For example, if an E5a (single peak) is being tracked and the earliest arriving signal is found, the arriving signal can be used to resolve the ambiguity of the E1b. A GPS L1-C ambiguity can be resolved via L5 or L1 C/A, etc. A BDS B1-C ambiguity can be resolved via B2a or B1-I. If other solutions do not resolve the signal ambiguity, the system may locate other signal to resolve the ambiguity. For example, the system may utilize Bluetooth and/or Wi-Fi sources. If no other solutions resolve the ambiguity, the system keeps the signal and checks the ambiguity at a regular rate (e.g., every one second). The navigation engine (NE) may use range and range rate measurements as an input, outputting user position and time. The NE may be performed via a Kalman Filter (KF). The KF operates best (most accurately) if it has an estimate of the errors on the measurements. Multipath mitigation is also described in U.S. patent application Ser. No. 16/408,277 entitled "MULTIPATH MITIGATION FOR GNSS RECEIVER," the entire contents of which are incorporated herein by reference.

Figure 7:
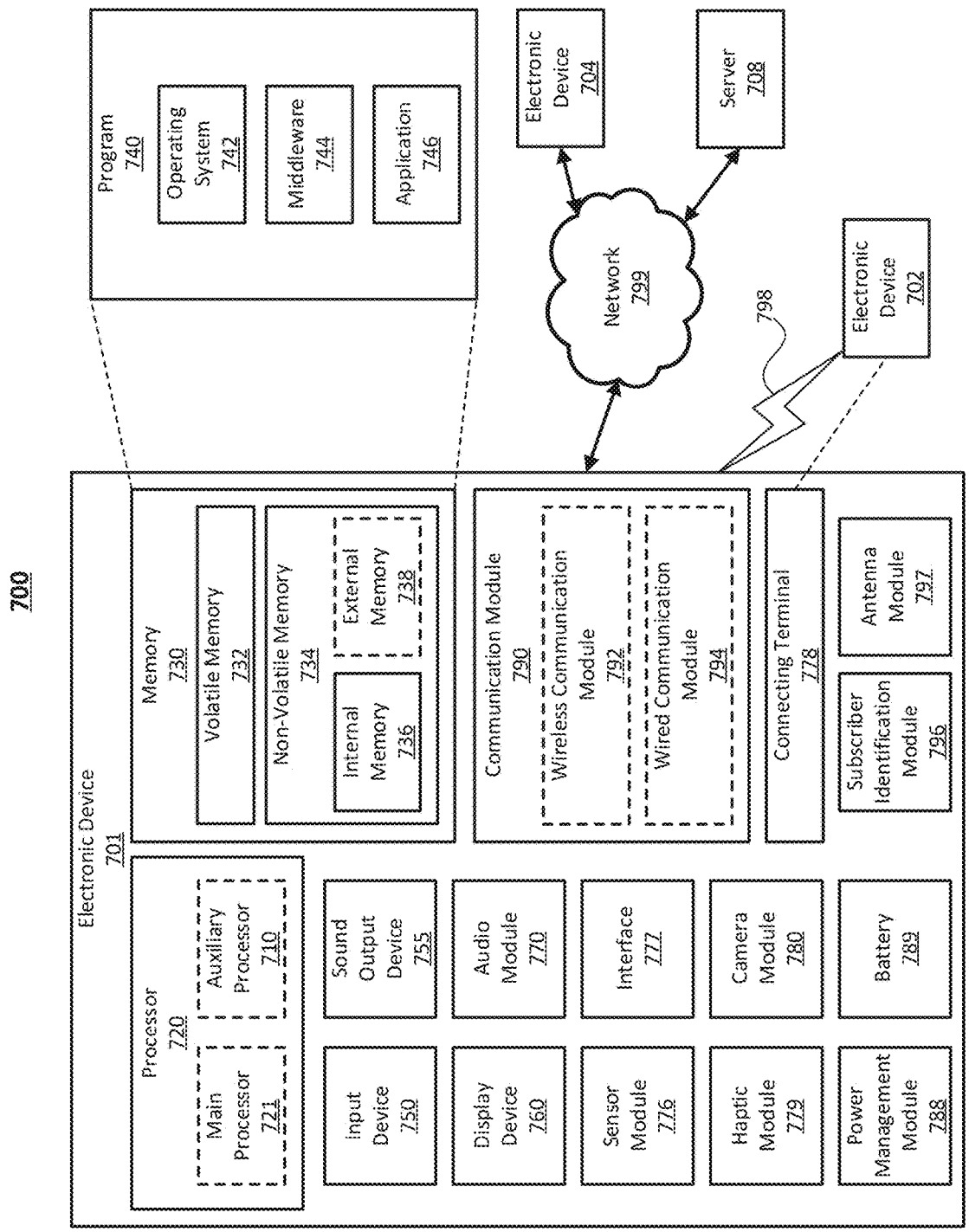
FIG. 7 illustrates a block diagram of an electronic device in a network environment, according to an embodiment.

FIG. 7 illustrates a block diagram of an electronic device 701 in a network environment 700, according to one embodiment. Referring to FIG. 7, the electronic device 701 in the network environment 700 may communicate with another electronic device 702 via a first network 798 (e.g., a short-range wireless communication network), or another electronic device 704 or a server 708 via a second network 799 (e.g., a long-range wireless communication network). The electronic device 701 may also communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an ISP or a CP) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, ISPs, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more CPs that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
receiving a global navigation satellite system (GNSS) signal;
determining a normalized correlation window of the GNSS signal;
determining an early sidelobe lock ($E_{lock}$) value, a late sidelobe lock ($L_{lock}$) value, and main sidelobe lock ($M_{lock}$) value based on the normalized correlation window;
determining a state of a receiver based on the determined $E_{lock}$, $L_{lock}$, and $M_{lock}$ values; and
when the state of the receiver is such that an early sidelobe of the GNSS signal, a late sidelobe of the GNSS signal, and a main sidelobe of the GNSS signal are false, performing multipath mitigation, wherein the early sidelobe, late sidelobe and main sidelobe of the GNSS signal are false when no positive main sidelobe, early sidelobe, and late sidelobe decisions are available.

2. The method of claim 1, wherein performing multipath mitigation includes retesting the GNSS signal for ambiguity resolution.

3. The method of claim 2, wherein retesting includes a subtraction algorithm or a pattern recognition algorithm.

4. The method of claim 1, wherein performing multipath mitigation includes determining whether a receiver time uncertainty is less than a predetermined uncertainty value threshold.

5. The method of claim 4, further comprising selecting a nearest peak of the GNSS signal when the receiver time uncertainty is less than the predetermined uncertainty value threshold.

6. The method of claim 1, wherein performing multipath mitigation includes determining whether another signal is being tracked unambiguously.

7. The method of claim 6, further comprising resolving the GNSS signal ambiguity based on the unambiguously tracked signal.

8. The method of claim 1, wherein performing multipath mitigation includes locating other signals to resolve ambiguity in the GNSS signal.

9. The method of claim 8, wherein the other signals include a Bluetooth signal or a Wi-Fi signal.

10. The method of claim 1, wherein performing multipath mitigation includes maintaining the GNSS signal and checking ambiguity in the GNSS signal at a regular rate.

11. A system, comprising:
a global navigation satellite system (GNSS) receiver;
a memory; and
a processor configured to:
determine a normalized correlation window of a received GNSS signal;
determine an early sidelobe lock ($E_{lock}$) value, a late sidelobe lock ($L_{lock}$) value, and main sidelobe lock ($M_{lock}$) value based on the normalized correlation window;
determine a state of the receiver based on the determined $E_{lock}$, $L_{lock}$, and $M_{lock}$ values; and
when the state of the receiver is such that an early sidelobe of the GNSS signal, a late sidelobe of the GNSS signal, and a main sidelobe of the GNSS signal are false, perform multipath mitigation,
wherein the early sidelobe, late sidelobe and main sidelobe of the GNSS signal are false when no positive main sidelobe, early sidelobe, and late sidelobe decisions are available.

12. The system of claim 11, wherein the processor is further configured to perform multipath mitigation by retesting the GNSS signal for ambiguity resolution.

13. The method of system 12, wherein retesting includes a subtraction algorithm or a pattern recognition algorithm.

14. The system of claim 11, wherein the processor is further configured to perform multipath mitigation by determining whether a receiver time uncertainty is less than a predetermined uncertainty value threshold.

15. The system of claim 14, the processor is further configured to select a nearest peak of the GNSS signal when the receiver time uncertainty is less than the predetermined uncertainty value threshold.

16. The system of claim 11, wherein the processor is further configured to perform multipath mitigation by determining whether another signal is being tracked unambiguously.

17. The system of claim 16, the processor is further configured to resolve the GNSS signal ambiguity based on the unambiguously tracked signal.

18. The system of claim 11, wherein the processor is further configured to perform multipath mitigation by locating other signals to resolve ambiguity in the GNSS signal.

19. The system of claim 18, wherein the other signals include a Bluetooth signal or a Wi-Fi signal.

20. The method of claim 11, wherein the processor is further configured to perform multipath mitigation by maintaining the GNSS signal and checking ambiguity in the GNSS signal at a regular rate.

* * * * *